Patented June 28, 1932

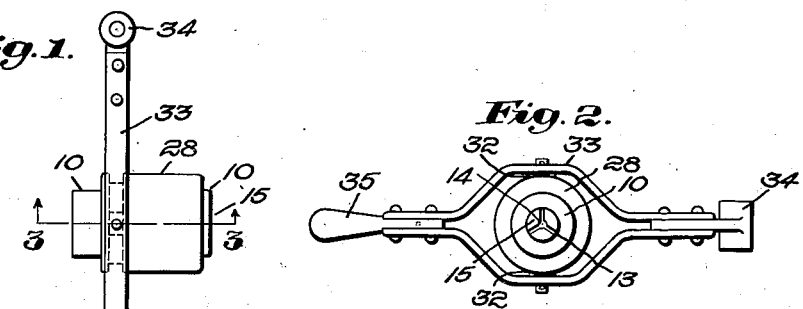

1,864,786

UNITED STATES PATENT OFFICE

ARTEMAS O. WILKINS, OF SAUGUS, MASSACHUSETTS

COLLET CHUCK

Application filed December 30, 1930. Serial No. 505,552.

This invention relates to a novel and improved collet chuck, and will best be understood by reference to the following description, when taken in connection with the accompanying drawing of one specific embodiment thereof, while its scope will be pointed out more particularly in the appended claims.

Fig. 1 is a plan of a collet chuck embodying the invention;

Fig. 2 is a front elevation of the same;

Fig. 3 is a sectional view on an enlarged scale on line 3—3 of Fig. 1; and

Fig. 4 is a sectional view on line 4—4 of Fig. 3.

Referring to the drawing and to the embodiment of the invention which is illustrated therein, there is shown a collet chuck comprising a chuck body 10 for attachment to a driving spindle, such as the spindle of a lathe, the chuck body to this end being internally screw-threaded as at 11 to receive the threaded end of the lathe spindle. Within the chuck body there is a collet 12, which is rendered radially expansible and contractible by providing the same with a plurality of slots 13. The collet is provided with an axial bore 14 to receive the work. The body and the chuck have cooperative means to cause the work to be gripped by the collet when the later is moved inwardly with relation to said body, the collet to this end being provided with a head 15, having a tapered, circumferential surface 16, while the body is provided with a correspondingly tapered surface 17.

A collar 18, having screw-threaded engagement with the collet, and thereby being adjustable lengthwise of the latter, is slidable lengthwise within the body, but is prevented from rotating therein by being provided with a plurality of lugs 19, which, as best shown in Fig. 4, are received in slots 20 provided in the chuck body. Resilient means, herein a spring 21, rests at one end against the collar 18, and at its other end against an abutment, herein a ring 22 threaded into the body. This spring is under compression, and constantly tends to thrust the collar 19, and therefore the collet 12, in an outward direction to relax the grip of the collet on the work. Inward movement of the collet to produce gripping action is caused by a plurality of levers 23, received in the slots 20, respectively, and mounted on pivots 24, said levers having short arms 25 engaging the lugs 19, respectively, and relatively longer arms 26, having rounded ends 27, whose normal position is shown in Fig. 3.

The arms 26 are actuated by a sleeve 28, about and slidable lengthwise of the chuck body 10, said sleeve having a cylindrical chamber 29, which normally receives the ends of the arms 26. The sleeve is also provided with a conical surface 30, which is in the nature of a cam so arranged that when the sleeve is moved axially in a rearward direction, (toward the left in Fig. 3), the rounded ends 27 of the arms 26 ride up the inclines presented by the conical surface 30, thereby rocking the levers on their pivots, and causing the arms 25 to thrust the collar 18 and the collet 12 inwardly (toward the left in Fig. 3). Naturally, the spring 21 tends to throw the arms 26 outwardly.

Axial movement of the sleeve 28 is produced by appropriate means, as by providing the sleeve with a circumferential groove 31 to receive a pair of blocks 32 appropriately secured to a yoke lever 33 embracing the chuck body, and having a fulcrum portion 34, adapted to be pivoted to a suitable fixed support (not shown) on the lathe, the lever being swung to and fro by a suitable handle 35.

In the operation of the chuck, the work, such as a slim rod, is passed through the collet and rests in the bore 14 of the latter. Then, without stopping the lathe, the operating lever 33 is swung toward the left (Fig. 1), thereby moving the sleeve 28 rearwardly, thus causing the arms 26 to be swung radially inwardly, and the arms 25 to be swung rearwardly. Engagement of the arms 25 with the lugs 19 causes the collar 18, and therefore the collet 12, to be moved inwardly toward the left (Fig. 3), thereby causing the cooperative tapered surfaces 16 and 17 to contract the collet about, and to grip the work. When the chuck is in its operating position, the rounded ends 27 of the arms 26 rest against a cylindrical surface 36 presented by the sleeve 28, which therefore locks the chuck in the position in which it grips the work.

Having thus described one embodiment of the invention, but without limiting myself thereto, what I claim and desire by Letters Patent to secure is:

1. In a collet chuck, the combination of a chuck body for attachment to a driving spindle; a collet; said body and said collet having cooperative means to cause work to be gripped by said collet when the latter is moved inwardly with relation to said body; and means to move said collet inwardly, the last-mentioned means including collet-actuating levers fulcrumed on said body and having short arms extending inwardly from the fulcrums of said levers and actuating said collet, and relatively longer arms extending lengthwise of and toward the outer end of said chuck-body, a sleeve about said levers and about and slidable lengthwise of said body and having a longitudinally tapered cam-surface about and engaging said longer arms to swing the latter inwardly toward the axis of rotation of the chuck; and means engaging said sleeve to move the latter lengthwise during the rotation of the chuck.

2. In a collet chuck, the combination of a chuck body for attachment to a driving spindle; a collet; a member attached to said collet to move said collet axially; said body and said member having cooperative means to prevent rotation of said member relatively to said body; said body and said collet having cooperative means to cause work to be gripped by said collet when the latter is moved inwardly with relation to said body; and means including an axially movable sleeve about said body and about said collet, and means within said sleeve and connected to said member to cause the latter to move said collet inwardly.

3. In a unitary, self-contained, collet chuck for attachment to the outer end of a driving spindle, the combination of a chuck body threaded for attachment to the driving spindle, said body being provided with longitudinal slots; a hollow collet through which the work may be passed; a member attached to said collet to move said collet axially, said member being provided with lugs received in said slots and thereby preventing rotation of said member relatively to said body; said body and said collet having cooperative means to cause work to be gripped by said collet when the latter is moved axially; and means including levers about and connected to said member to move the latter and therefore said collet axially, said levers being received in said slots and engaging said lugs.

4. In a unitary, self-contained, collet chuck for attachment to the outer end of a driving spindle, the combination of a chuck body threaded for attachment to the driving spindle, said body being provided with longitudinal slots; a hollow collet through which the work may be passed; a member attached to said collet to move said collet axially, said member being provided with lugs received in said slots and thereby preventing rotation of said member relatively to said body; said collet and said body having cooperative means to utilize inward movement of said collet to cause the work to be gripped by said collet when the latter is moved inwardly; and means connected to said member to cause the latter to move said collet inwardly, the last-mentioned means including an axially slidable sleeve about said body and about said collet, and levers received in said slots and having arms engaging said lugs and arms engaging said sleeve.

5. In a unitary, self-contained, collet chuck for attachment to the outer end of a driving spindle, the combination of a chuck body threaded for attachment to a driving spindle, said body being provided with longitudinal slots; a hollow collet through which the work may be passed; lugs connected to said collet and received in said slots; said collet and said body having cooperative means to utilize inward movement of said collet to cause work to be gripped by said collet when the latter is moved inwardly; and means connected to said lugs to cause said member to move said collet inwardly, the last-mentioned means including levers pivoted to said body and having arms extending toward the outer end of said body and disposed about said collet, and an axially slidable, lever-actuating sleeve disposed about said collet, about said body, and about said levers, and having an internal surface about and engaging said arms, said levers being received in said slots and having arms engaging said lugs.

In testimony whereof, I have signed my name to this specification.

ARTEMAS O. WILKINS.